United States Patent
Katayama et al.

(10) Patent No.: US 9,803,289 B2
(45) Date of Patent: Oct. 31, 2017

(54) TUBE-TYPE OZONE GENERATOR AND MANUFACTURING METHOD THEREFOR

(71) Applicant: SUMITOMO PRECISION PRODUCTS CO., LTD., Hyogo (JP)

(72) Inventors: Nobuhide Katayama, Hyogo (JP); Masanori Toriyabe, Hyogo (JP); Yuji Terashima, Hyogo (JP); Tadashi Kimoto, Hyogo (JP); Hisaji Yoshida, Hyogo (JP)

(73) Assignee: SUMITOMO PRECISION PRODUCTS CO., LTD, Hyogo (JP)

( * ) Notice: Subject to any disclaimer, the term of this patent is extended or adjusted under 35 U.S.C. 154(b) by 49 days.

(21) Appl. No.: 14/430,053

(22) PCT Filed: Jan. 31, 2013

(86) PCT No.: PCT/JP2013/000546
§ 371 (c)(1),
(2) Date: Mar. 20, 2015

(87) PCT Pub. No.: WO2014/076851
PCT Pub. Date: May 22, 2014

(65) Prior Publication Data
US 2015/0247246 A1    Sep. 3, 2015

(30) Foreign Application Priority Data

Nov. 19, 2012  (JP) ................................. 2012-253606

(51) Int. Cl.
*C25B 9/08*        (2006.01)
*C25B 9/00*        (2006.01)
(Continued)

(52) U.S. Cl.
CPC ................ *C25B 9/08* (2013.01); *C01B 13/11* (2013.01); *C25B 1/13* (2013.01); *C01B 2201/14* (2013.01);
(Continued)

(58) Field of Classification Search
CPC ................ C25B 9/00; C25B 9/08; C25B 1/13
(Continued)

(56) References Cited

U.S. PATENT DOCUMENTS 1,588,976 A  *  6/1926  McBlain ................. C01B 13/11
                                                    29/455.1
2,643,224 A      6/1953  Niccoli
(Continued)

FOREIGN PATENT DOCUMENTS

CN    102530879 A     7/2012
JP    53-73253 U     11/1976
(Continued)

OTHER PUBLICATIONS

Extended European Search Report dated Jun. 9, 2016 for corresponding European Application No. 13855640.2.
(Continued)

*Primary Examiner* — Zulmariam Mendez
(74) *Attorney, Agent, or Firm* — Renner, Otto, Boisselle & Sklar, LLP

(57) ABSTRACT

A tube-type ozone generator 1 including an ozone generation unit 30A is provided. The ozone generation unit 30A includes an outer electrode tube 31 and an inner electrode tube 32 provided inside the outer electrode tube with a discharge gap 36 interposed between the outer and inner electrode tubes 31 and 32. The inner electrode tube 32 has a dielectric tube 33 and a cylindrical electrode 34 being in
(Continued)

close contact with an inner circumferential surface of the dielectric tube 33. The electrode 34 is removably disposed inside the dielectric tube 33.

6 Claims, 9 Drawing Sheets

(51) Int. Cl.
  *C25B 1/13* (2006.01)
  *C01B 13/11* (2006.01)
(52) U.S. Cl.
  CPC .... *C01B 2201/32* (2013.01); *C02F 2201/782* (2013.01)
(58) Field of Classification Search
  USPC ........................................ 204/242, 260, 288
  See application file for complete search history.

(56) References Cited

U.S. PATENT DOCUMENTS

| | | |
|---|---|---|
| 3,967,131 A | 6/1976 | Slipiec et al. |
| 5,433,927 A | 7/1995 | Mausgrover et al. |
| 2007/0166209 A1 | 7/2007 | Zimmerman |
| 2012/0156106 A1 | 6/2012 | Murata et al. |

FOREIGN PATENT DOCUMENTS

| | | |
|---|---|---|
| JP | 51-145489 A | 12/1976 |
| JP | 53-047394 A | 4/1978 |
| JP | 55-100205 A | 7/1980 |
| JP | 6-17210 B2 | 3/1994 |
| JP | 9-173868 A | 7/1997 |
| JP | 11-1305 A | 1/1999 |
| JP | 7-45073 B2 | 5/1999 |
| JP | 2009-291695 A | 12/2009 |
| JP | 2012-144425 A | 8/2012 |
| WO | WO 2010/021022 A1 | 2/2010 |

OTHER PUBLICATIONS

International Search Report for corresponding International Application No. PCT/JP2013/000546, dated May 14, 2013.
PCT/ISA/237 for corresponding International Application No. PCT/JP2013/000546, dated May 14, 2013.

* cited by examiner

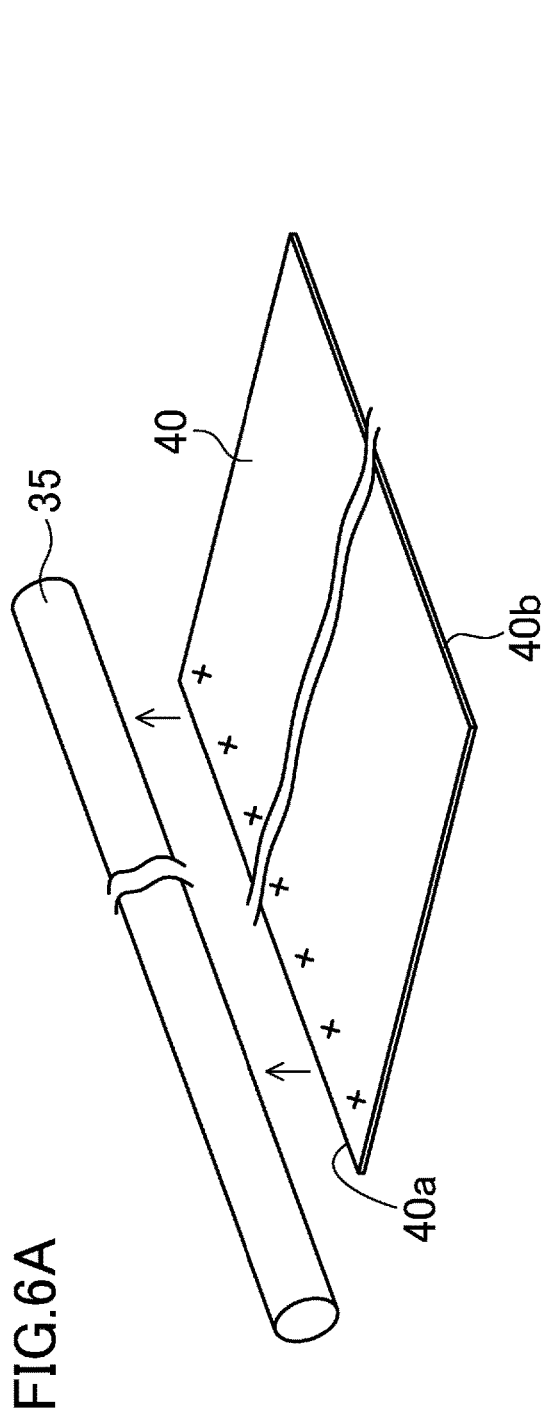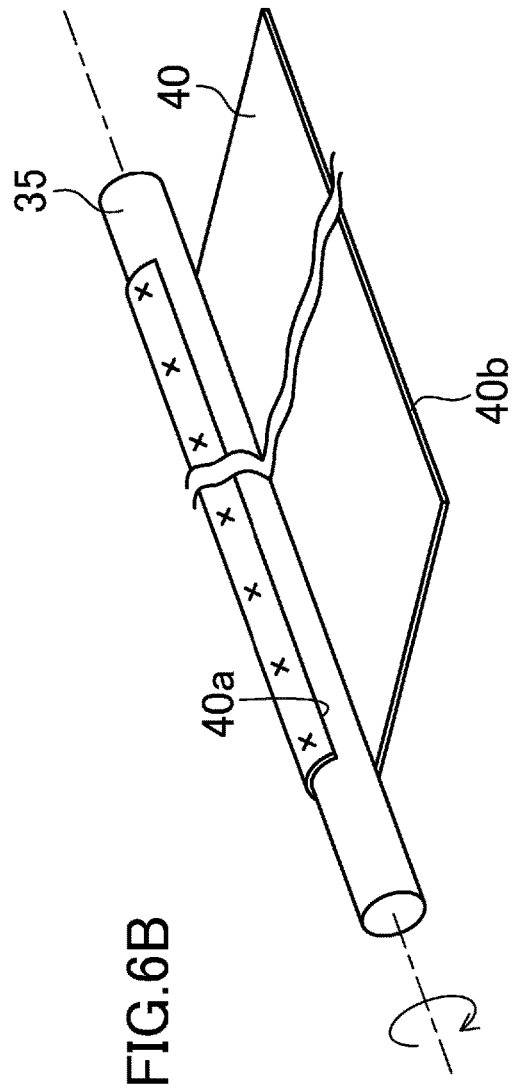

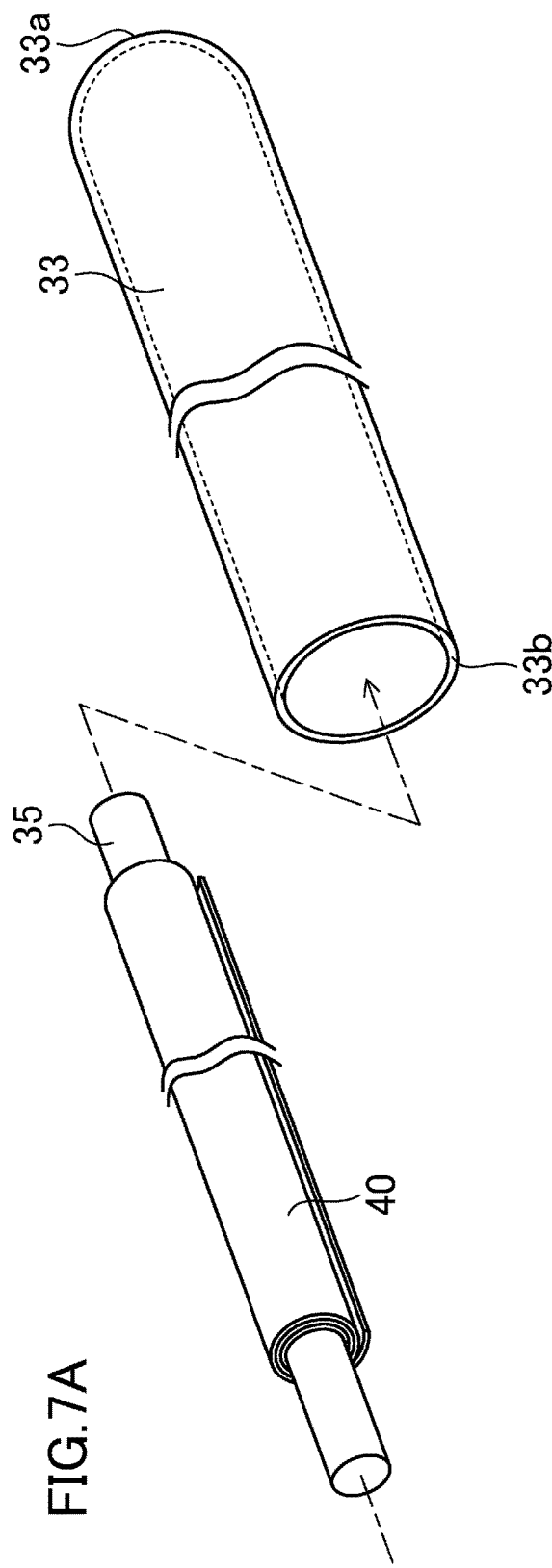
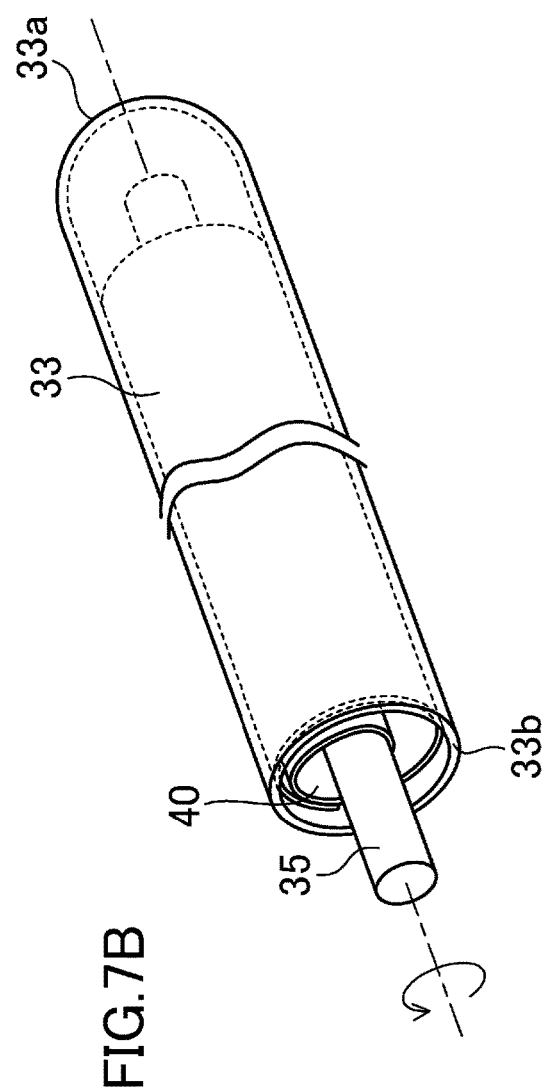
FIG.7A
FIG.7B

TUBE-TYPE OZONE GENERATOR AND MANUFACTURING METHOD THEREFOR

TECHNICAL FIELD

The present invention relates to a tube-type ozone generator and a manufacturing method of the same.

BACKGROUND ART

Ozone has a strong oxidizing power. After oxidizing other substances, ozone decomposes into harmless substances such as oxygen. Therefore, ozone is widely used for, e.g., cleaning process, sterilization process, and deodorization process in the fields of semiconductor device manufacturing, food production, water treatment, etc.

Many of ozone generators in actual use are of the silent discharge type.

Each ozone generator of the silent discharge type includes two electrodes facing each other via a dielectric, and a gap (a discharge gap) is provided between the two electrodes. When a high voltage is applied between the two electrodes, a silent discharge occurs in the discharge gap. Ozone is generated by causing a source gas containing oxygen to flow into the discharge gap, where the source gas is ozonized.

The ozone generators of the silent discharge type are classified into the plate type and the tube type according to their structural difference. The plate-type ozone generator includes an ozone generation unit in a plate shape. On the other hand, the tube-type ozone generator includes an ozone generation unit in a tube shape.

While the plate-type ozone generator is generally unsuitable for upsizing, the tube-type ozone generator does not have such a disadvantage and is capable of operating with an increased number of the units. Thus, the tube-type ozone generator is advantageous in that it can be upsized easier than the plate-type one.

For example, Patent Documents 1 and 2 describe prior art related to the present invention.

Patent Document 1 discloses a tube-type ozone generator. This ozone generator includes a glass dielectric tube having a cylindrical shape and a spherically closed end. A first electrode made of a metal such as stainless steel is formed on the inner surface of the dielectric tube, specifically, on a portion of the inner surface extending from the spherical end to the side of the dielectric tube.

A rod-shaped high-voltage feeder electrically connected to a high-voltage power supply is provided inside the dielectric tube. The first electrode is electrically connected to the high-voltage feeder through a stainless steel wool material. A cylindrical second electrode surrounds the outer surface of the dielectric tube. A discharge gap is provided between the dielectric tube and the second electrode.

A source gas is ozonized while passing through the discharge gap under application of a high voltage. The ozonized gas is let out through an ozonized gas outlet near which the spherical end is located.

Patent Document 2 also discloses a tube-type ozone generator similar to that of Patent Document 1. Specifically, the ozone generator of Patent Document 2 includes a dielectric electrode corresponding to the glass dielectric tube, and a conductive film corresponding to the first electrode. The conductive film is formed on the inner surface of the dielectric electrode by vapor deposition or thermal spraying, for example.

A feeder axis corresponding to the high-voltage feeder has stainless steel constituent wires attached thereto and bundled in a twisted brush-like shape. These constituent wires are pressed onto a cylinder made of a metal plate and attached to part of the inner surface of the conductive film, thereby electrically connecting the conductive film to the feeder axis.

CITATION LIST

Patent Document

PATENT DOCUMENT 1: Japanese Unexamined Patent Publication No. 2012-144425

PATENT DOCUMENT 2: International Publication No. WO 2010/021022 A1

SUMMARY OF THE INVENTION

Technical Problem

According to the tube-type ozone generator of Patent Document 1 or 2, an end of the dielectric tube located in an upstream portion where the source gas flows is opened, and the other end located in a downstream portion where ozone flows is sealed. Accordingly, in a normal state, the source gas may be allowed to enter the dielectric tube whereas ozone is not allowed to do so.

When the ozone generator is out of operation, however, ozone may flow backward to or diffuse in the upstream portion to enter the dielectric tube. The entry of ozone into the dielectric tube may cause a defect such as rust, thereby creating a need for replacement of the electrode.

Unfortunately, the conventional ozone generators have the structure including the electrode formed by, e.g., vapor deposition, and accordingly, this structure does not allow separation of the electrode from the dielectric tube. Thus, when the need arises, the electrode must be replaced, together with the dielectric tube to which it is attached.

In addition, since the formation of the electrode by vapor deposition or the like requires a large number of manufacturing steps, the productivity of the conventional ozone generators is insufficient.

It is therefore an object of the present invention to provide a tube-type ozone generator of which an electrode can be easily replaced, and a manufacturing method of the ozone generator.

Solution to the Problem

The present invention relates to a tube-type ozone generator comprising a tubular ozone generation unit. The ozone generation unit includes a cylindrical outer electrode tube, and an inner electrode tube provided inside the outer electrode tube with a discharge gap interposed between the outer and inner electrode tubes. The inner electrode tube includes a cylindrical dielectric tube, and a cylindrical electrode being in close contact with an inner circumferential surface of the dielectric tube. The electrode is removably disposed inside the dielectric tube.

Thus, the ozone generator includes the cylindrical electrode removably disposed inside the dielectric tube and being in close contact with the inner circumferential surface of the dielectric tube. Therefore, the electrode can be removed from the dielectric tube for replacement.

Specifically, the electrode may be a plate-shaped conductor having elasticity, and may be in close contact with the inner circumferential surface of the dielectric tube as a result of having been spread inside the dielectric tube by its own elasticity.

Thus, the installation of the electrode can be performed simply by rolling up the conductor and inserting the rolled up conductor into the dielectric tube. This makes easy the replacement of the electrode.

In that case, for example, the electrode may be electrically connected to an external power supply through a terminal lead extending from the electrode.

The inner electrode tube may further includes a terminal rod disposed inside the dielectric tube, an edge of a portion of the conductor extending in a radial direction may be joined to the terminal rod, and the electrode may be electrically connected to an external power supply through the terminal rod.

In the former case where the terminal lead is employed, the ozone generator can be manufactured by a method including, e.g., preparing the conductor by rolling up the conductor in a cylindrical shape, inserting the rolled up conductor into the dielectric tube, and spreading the conductor inside the dielectric tube without applying external force.

In the latter case where the terminal rod is employed, the ozone generator can be manufactured by a method including, e.g., joining the edge of the conductor to the terminal rod, winding the conductor around the terminal rod, inserting the terminal rod having the conductor wound therearound into the dielectric tube, and spreading the conductor inside the dielectric tube without applying external force.

Advantages of the Invention

According to the ozone generator of the present invention and the method for manufacturing the ozone generator, replacement of the electrode of the ozone generation unit can be easily performed.

BRIEF DESCRIPTION OF THE DRAWINGS

FIGS. 6A and 6B are perspective views schematically illustrating parts of manufacturing steps of the ozone generator according to the first embodiment.

FIGS. 7A and 7B are perspective views schematically illustrating parts of manufacturing steps of the ozone generator according to the first embodiment.

DESCRIPTION OF EMBODIMENTS

Embodiments of the present invention will be described hereinafter with reference to the drawings. Note that the following embodiments are merely illustrative examples in nature, and are not intended to limit the scope, applications, and use of the invention.

First Embodiment (Configuration of Ozone Generator)

Figure 1:
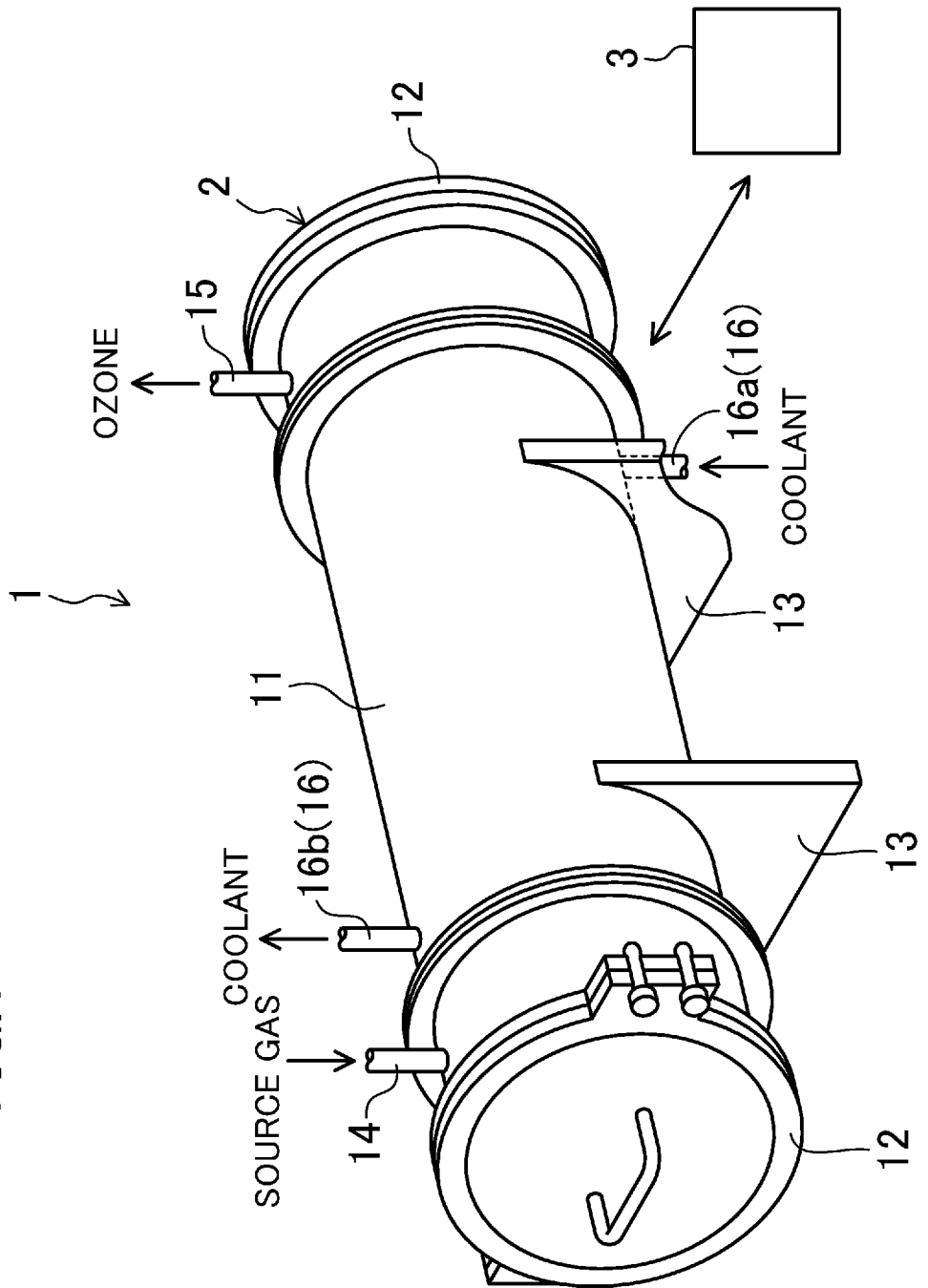
FIG. 1 is a perspective view schematically illustrating an ozone generator according to a first embodiment.

FIG. 1 illustrates a tube-type ozone generator 1 according to a first embodiment.

The ozone generator 1 includes, e.g., a body 2 and accessory equipment 3 including a controller, an operating panel, etc. which cooperate with the body 2.

The body 2 is a pressure-resistant container which is made of stainless steel of high corrosion resistance, and inside which ozone is generated. The body 2 has a barrel portion 11 in a cylindrical shape and two lids 12 closing both ends of the barrel portion 11. The body 2 is horizontally oriented, and supported by a pair of legs 13 and 13. One of the lids 12 is attached to the barrel portion 11 with a hinge and serves as a door.

For example, a source gas pipe 14, an ozone pipe 15, and coolant pipes 16 are connected to the body 2. Specifically, the source gas pipe 14 is connected to a source gas supply (not shown). A source gas such as air or oxygen is supplied to the body 2 through the source gas pipe 14. The ozone pipe 15 is connected to a target (not shown) to which ozone is to be supplied. Ozone generated in the body 2 is sent to the target through the ozone pipe 15.

The coolant pipes 16 include two pipes, i.e., a coolant inlet pipe 16a and a coolant outlet pipe 16b. Each of the pipes 16a and 16b is connected to a heat exchanger (not shown), for example. A coolant is supplied to and circulated through the body 2 through the coolant pipes 16a and 16b.

Figure 2:
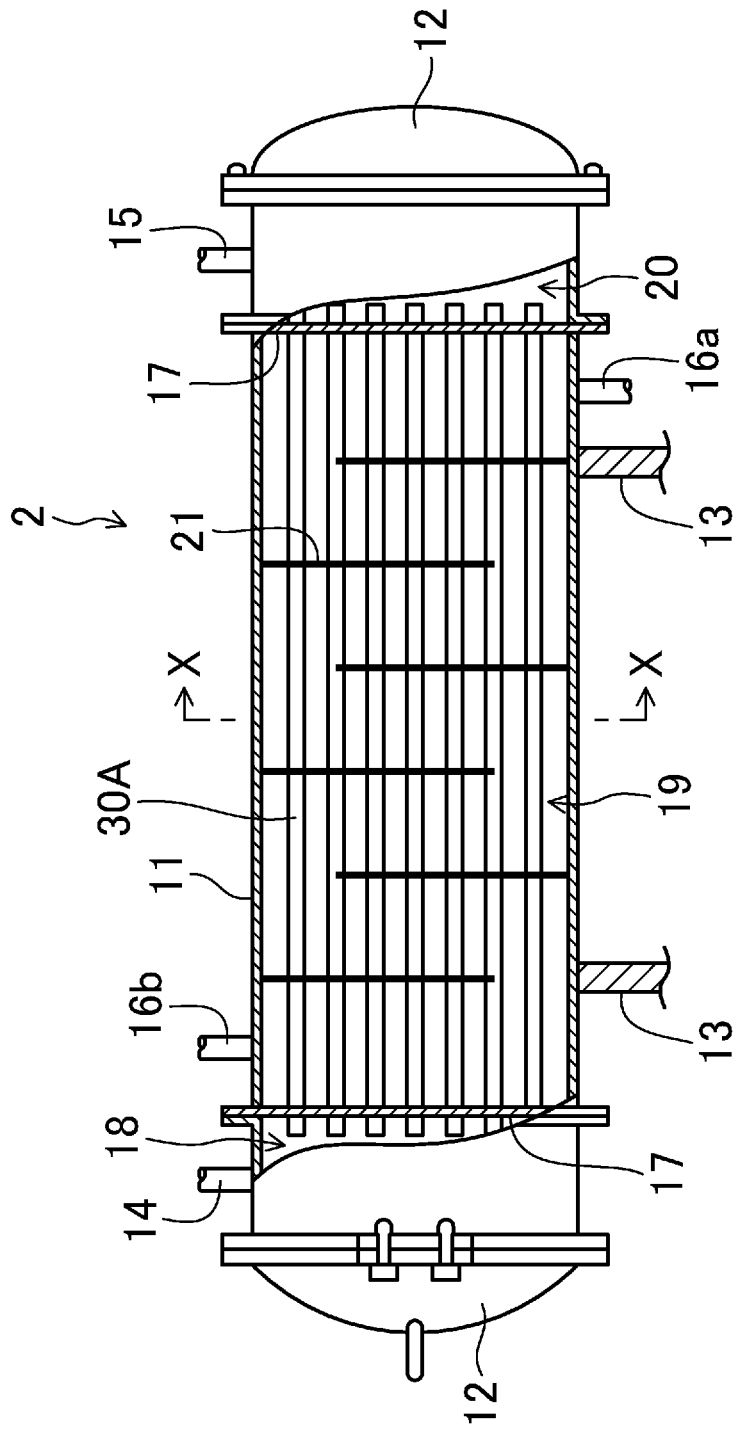
FIG. 2 schematically illustrates an inner structure of a body of the ozone generator.

As illustrated in FIG. 2, two partition plates 17 and 17 made of stainless steel partition the inner space of the body 2 into a source gas chamber 18, a cooling chamber 19, and an ozone chamber 20. The source gas chamber 18 is located in an end portion of the body 2, and communicates with the source gas pipe 14. The ozone chamber 20 is located in the other end portion of the body 2, and communicates with the ozone pipe 15.

The cooling chamber 19 is located between the source gas chamber 18 and the ozone chamber 20, and occupies the major portion of the body 2. A lower corner portion of the cooling chamber 19 located toward the ozone chamber 20 communicates with the coolant inlet pipe 16a. An upper corner portion of the cooling chamber 19 located toward the source gas chamber 18 communicates with the coolant outlet pipe 16b. A plurality of regulation plates 21 are arranged at predetermined intervals in the cooling chamber 19. The regulation panels 21 define a vertically serpentine path through which the coolant meanders in the cooling chamber 19.

Figure 3:
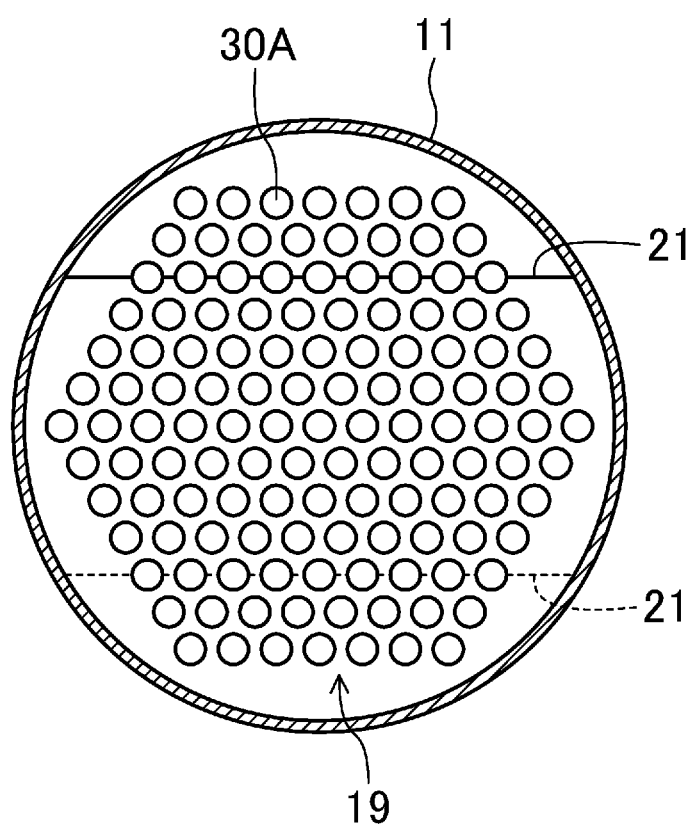
FIG. 3 is a schematic cross-sectional view taken along the line X-X in FIG. 2.

As illustrated in FIG. 3, a plurality of tubular ozone generation units 30A are densely arranged in the body 2. Each ozone generation unit 30A extends along the longitudinal direction of the barrel portion 11 and across the cooling chamber 19. The upstream end of each ozone generation unit 30A projects into the source gas chamber 18. The downstream end of each ozone generation unit 30A projects into the ozone chamber 20.

It is not essential that the ends of each ozone generation unit 30A project into the source gas chamber 18 and the ozone chamber 20. The end of each ozone generation unit 30A may be located inside the cooling chamber 19 or at the interface between the cooling chamber 19 and the source gas chamber 18, for example. In each ozone generation unit 30A, ozone is generated from the source gas.

(Configuration of Ozone Generation Unit)

Figure 4:
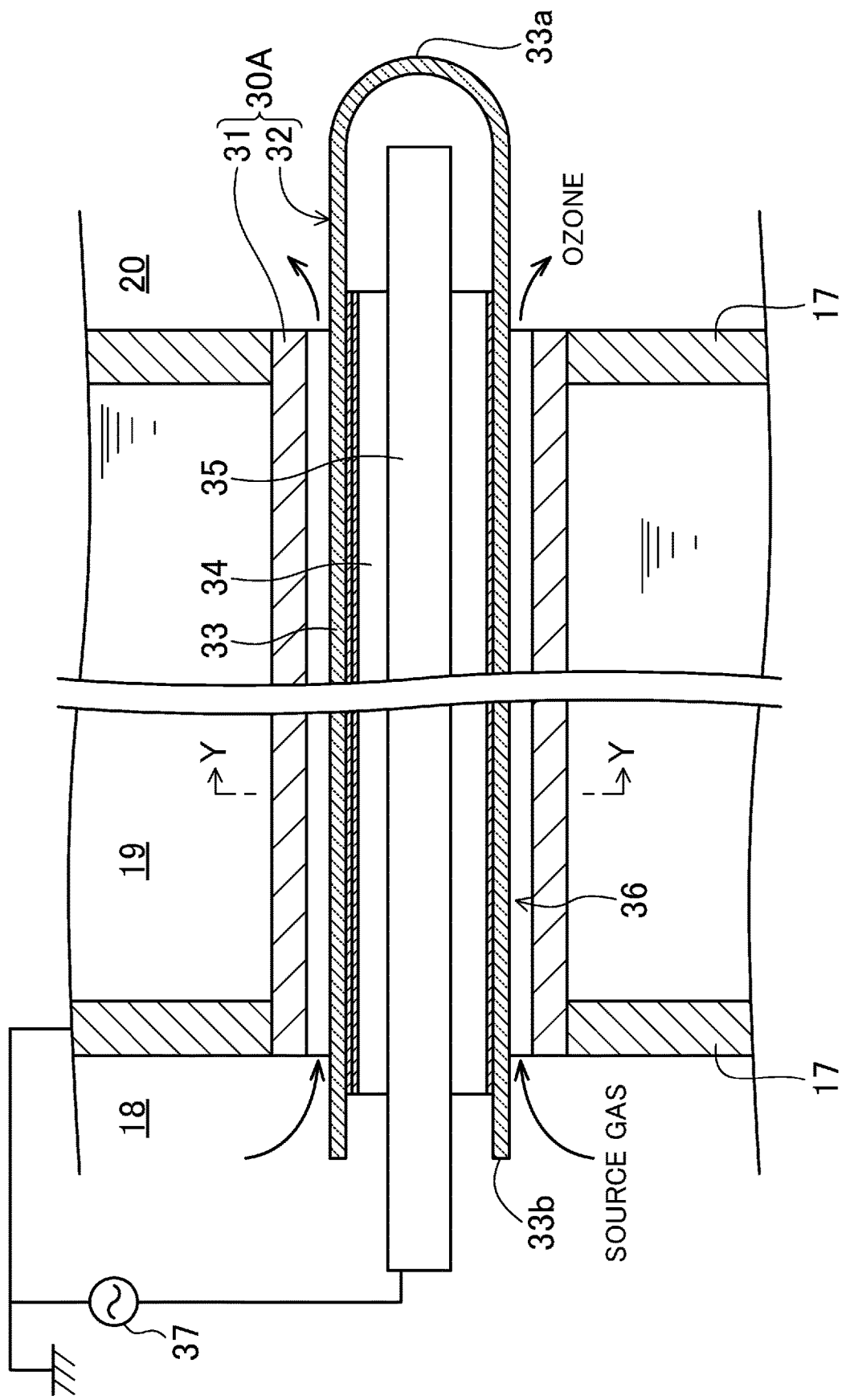
FIG. 4 is a cross-sectional view schematically illustrating a structure of an ozone generation unit.

FIG. 4 illustrates the ozone generation unit 30A in detail. The ozone generation unit 30A includes an outer electrode tube 31 and an inner electrode tube 32.

The outer electrode tube 31 is made of a cylindrical stainless steel tube, and has both ends joined to the partition plates 17 without leaving any clearance. The outer electrode tube 31 is electrically grounded through the partition plates 17, and serves as an electrode of a low-voltage side. The space surrounding the outer electrode tube 31 is filled with the coolant, and thus, each ozone generation unit 30A is cooled by the coolant. The inner electrode tube 32 is located inside and concentrically with the outer electrode tube 31.

The inner electrode tube 32 of this embodiment includes, e.g., a dielectric tube 33, an electrode 34, and a terminal rod 35.

The dielectric tube 33 is a long and narrow cylindrical member made of, e.g., ceramic or glass, and having a closed end. The outer circumferential surface of the dielectric tube 33 faces the inner circumferential surface of the outer electrode tube 31 with a slight gap (a discharge gap 36) interposed therebetween. The closed end (the closed end 33a) of the dielectric tube 33 is located in the ozone chamber 20, and the other end which is open (the open end 33b) is located in the source gas chamber 18.

The terminal rod 35 is a rod-shaped conductor made of stainless steel, for example. The terminal rod 35 is disposed inside the dielectric tube 33 such that the front end of the terminal rod 35 reaches the vicinity of the closed end 33a. The rear end of the terminal rod 35 projects from the open end 33b. A high-voltage side of an external power supply 37 is connected to the rear end of the terminal rod 35.

The electrode 34 is a cylindrical member made of a conductor 40 having high elasticity and high electric conductivity and being in a thin rectangular plate shape. An example of the material for the electrode 34 is a stainless steel spring plate.

Figure 5:
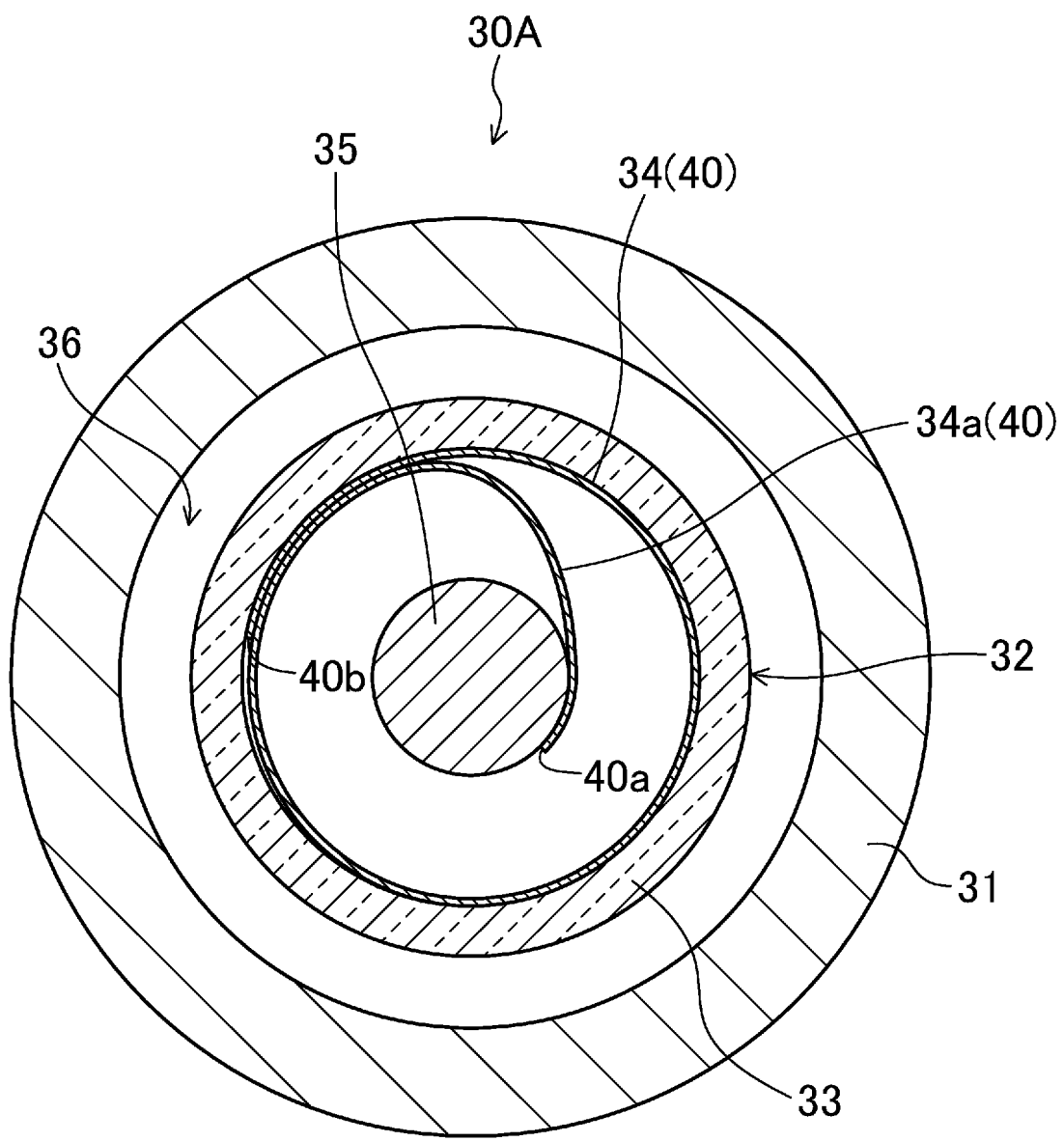
FIG. 5 is a schematic cross-sectional view taken along the line Y-Y in FIG. 4.

Specifically, as illustrated in FIG. 5, a portion near a long edge (a fixed edge 40a) of the conductor 40 is joined to the terminal rod 35. The conductor 40 is spread, by its own elasticity, radially outwardly in the dielectric tube 33. Accordingly, a portion near the other long edge (the free edge 40b) of the conductor 40 is radially outwardly moved toward the inner circumferential surface of the dielectric tube 33, thereby comes into close contact with the inner circumferential surface of the dielectric tube 33.

On the inner circumferential surface of the dielectric tube 33, the free edge 40b overlaps a middle portion of the conductor 40 each other in the radial direction. Thus, the inner circumferential surface of the dielectric tube 33 is entirely covered with the conductor 40. In this manner, the conductor 40 forms the cylindrical electrode 34.

In other words, according to the ozone generation unit 30A, the conductor 40, which is rolled up to have a helical cross section, has a portion extending in the circumferential direction and serving as the electrode 34 and a portion (a relay portion 34a) extending in the radial direction and connecting the electrode 34 to the terminal rod 35. Thus, the electrode 34 is in direct connection with the terminal rod 35, through which the electrode 34 is in electrical connection with the external power supply 37.

(Operation of Ozone Generator)

The coolant is supplied to and circulated through the cooling chamber 19, and cools the ozone generation units 30A. The external power supply 37 applies a high voltage between the outer electrode tube 31 and the inner electrode tube 32 of each ozone generation unit 30A being cooled by the coolant, thereby causing a silent discharge in each discharge gap 36.

A source gas supplied to the body 2 flows from the source gas chamber 18 into each discharge gap 36. During passage of the source gas through each discharge gap 36, ozone is generated. The generated ozone flows out of each discharge gap 36 to enter the ozone chamber 20, and then, is sent to the target through the ozone pipe 15. Accordingly, when the ozone generator is in operation, the source gas is constantly flowing into the source gas chamber 18, which prevents ozone from entering the source gas chamber 18.

When the ozone generator 1 is halted and supply of the source gas is stopped, ozone remaining in the discharge gaps 36 and the ozone chamber 20 may flow backward and enter the source gas chamber 18. When the ozone having entered the source gas chamber 18 reaches the inside of the dielectric tube 33, corrosion is caused on the electrode 34, for example.

Since the electrode 34 of the ozone generator 1 is configured to be installed simply by inserting the same into the dielectric tube 33, the electrode 34 can be easily removed from the ozone generator 1 when a need for replacement of the electrode 34 and the like arises. Specifically, the replacement can be performed by simply pulling out the electrode rod 35 and the electrode 34 together from the dielectric tube 33. In a case where the ozone generator 1 is large-sized and includes hundreds of ozone generation units 30A, this configuration can significantly reduce the costs for replacement.

(Manufacturing Method of Ozone Generator)

FIGS. 6 and 7 illustrate steps of manufacturing an ozone generator 1. Specifically, FIGS. 6 and 7 illustrate the steps of installing a terminal rod 35 and an electrode 34 into a dielectric tube 33. These steps constitute part of steps of fabricating an ozone generation unit 30A.

As illustrated in FIG. 6A, an edge portion of a conductor 40 is joined to the terminal rod 35 (a joining step). Specifically, a portion near a fixed edge 40a of the conductor 40 is joined to the terminal rod 35 by spot welding. Thereafter, as illustrated in FIG. 6B, the conductor 40 is wound around the terminal rod 35 (a winding step).

Next, as illustrated in FIG. 7A, the terminal rod 35 having the conductor 40 wound therearound is inserted into the dielectric tube 33 (an insertion step). Finally, as illustrated in FIG. 7B, a restraint is removed from the conductor 40, and the terminal rod 35 is rotated in the direction opposite to the winding direction of the conductor 40, for example, thereby spreading the conductor 40 inside the dielectric tube 33 until the conductor 40 has the shape as illustrated in FIG. 5 (a spreading step).

Thus, the ozone generation unit 30A can be considerably easily fabricated. Since a large number of the ozone generation units 30A are installed in the ozone generator 1, this method can increase the productivity.

Second Embodiment

Figure 8:
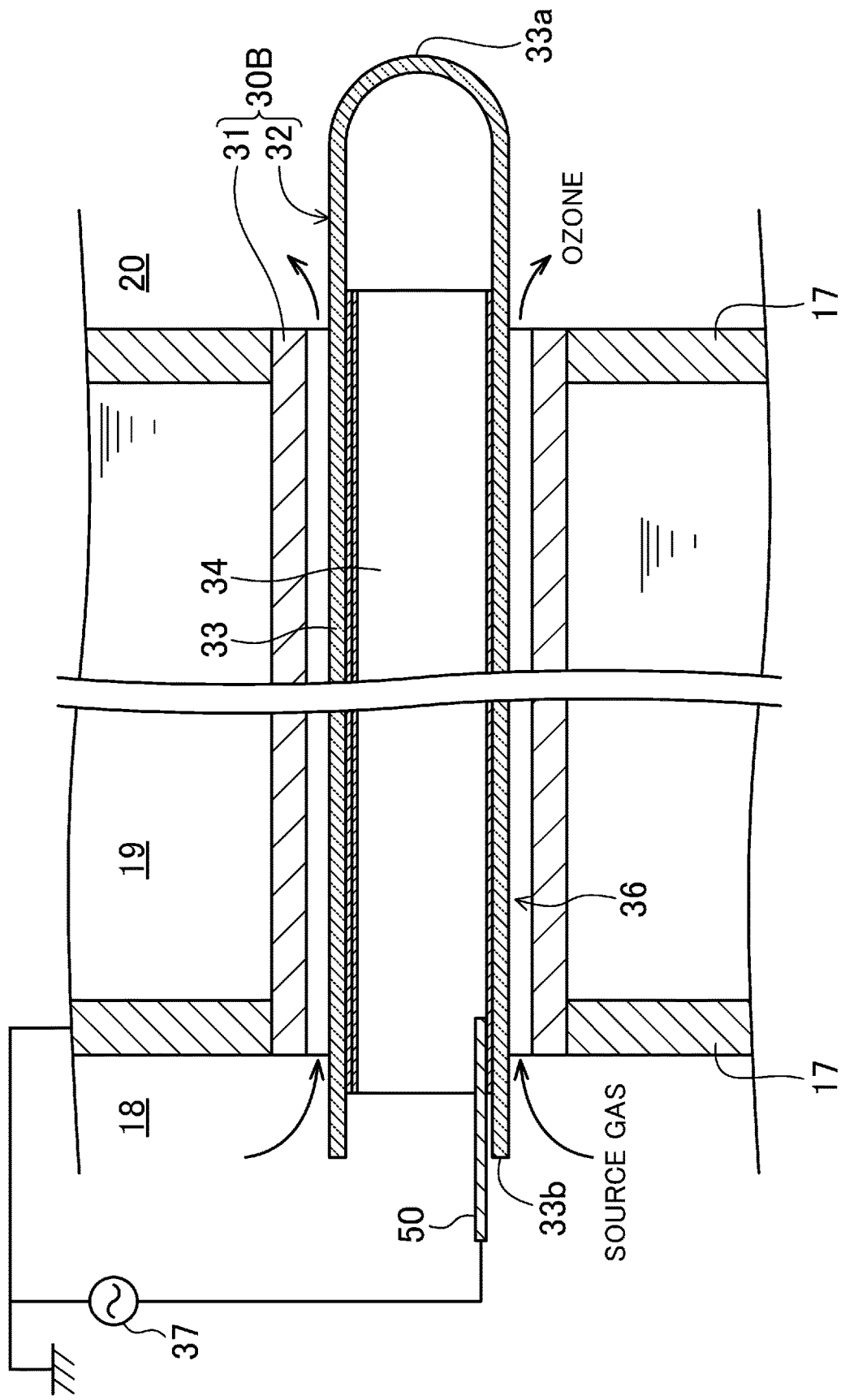
FIG. 8 is a cross-sectional view schematically illustrating ozone generator according to a second embodiment.

FIG. 8 illustrates an ozone generation unit 30B that is the main part of an ozone generator according to a second embodiment. The ozone generation unit 30B of this embodiment is structurally different from the ozone generation unit 30A of the first embodiment in that the unit 30B is devoid of the terminal rod 35.

The other components such as the body 2 of the second embodiment are the same as those of the ozone generator 1 of the first embodiment. The same components are denoted by the same reference characters, and the descriptions of the same components are not repeated.

In the ozone generation unit 30B, an electrode 34 is electrically connected to an external power supply 37 through a terminal lead. Specifically, a narrow piece 50 of a highly conductive metal plate made of, e.g., stainless steel is joined to an edge of the electrode 34 located toward an open end 33b. Part of the metal piece 50 projects from the open end 33b and serves as the terminal lead, which is electrically connected to the external power supply 37.

The ozone generation unit 30B can also be fabricated easily.

Figure 9:
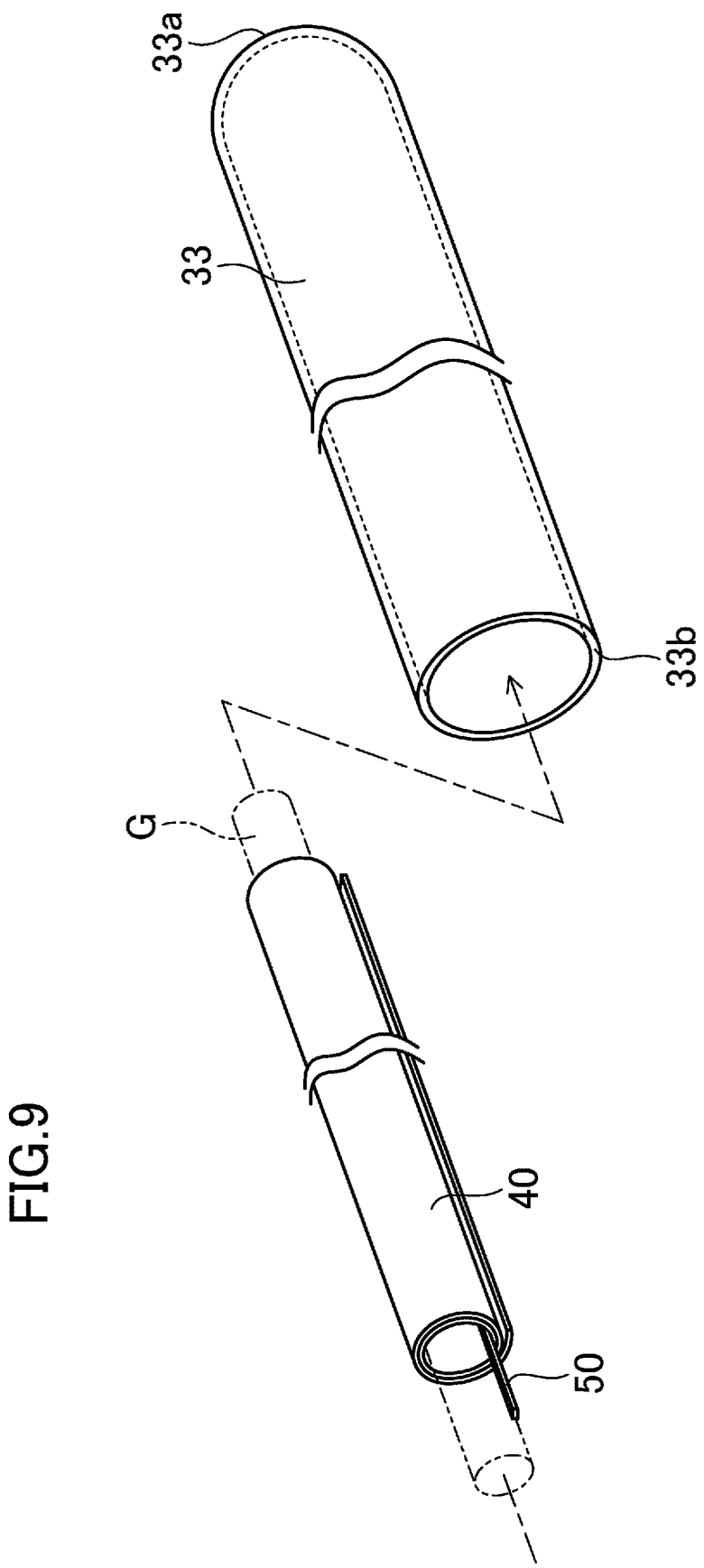
FIG. 9 is a perspective view schematically illustrating part of manufacturing steps of the ozone generator according to the second embodiment.

For example, the metal piece 50 is joined to a short edge of the conductor 40 in advance. Thereafter, as illustrated in FIG. 9, the conductor 40 is rolled up into a cylindrical shape such that the metal piece 50 is positioned inside the cylindrical shape (a preparation step). The conductor 40 is then inserted, from the other short edge, into a dielectric tube 33 (an insertion step). A guide rod G may be inserted into the rolled up conductor 40 so as to facilitate these steps.

After these steps, the conductor 40 is spread inside the dielectric tube 33 (a spreading step), in a manner similar to that of the ozone generator 1 of the first embodiment. The guide rod G, if used, can be pulled out at this time.

In the ozone generation unit 30B, the whole of the conductor 40 is spread along the inner circumferential surface of the dielectric tube 33. Thus, the whole of the conductor 40 extends in the circumferential direction to form the electrode 34, with no portion extending in the redial direction.

<Modifications>

The terminal lead may be integral with the conductor 40 forming the electrode 34. Specifically, a short edge of the conductor 40 may have a portion projecting and forming the terminal lead. Alternatively, the metal piece 50 forming the terminal lead may be attached after the spreading step.

Since the electrode 34 can be replaced, the electrode 34 does not necessarily have to have high resistance to corrosion. An inexpensive and highly conductive metal conductor other than stainless steel can be used as the material for the electrode 34. It is sufficient that one ozone generator includes at least one ozone generation unit.

DESCRIPTION OF REFERENCE CHARACTERS

1 Ozone Generator
2 Body
30A, 30B Ozone Generation Unit
31 Outer Electrode Tube
32 Inner Electrode Tube
33 Dielectric Tube
34 Electrode
35 Terminal Rod
36 Discharge Gap
37 External Power Supply
40 Conductor

The invention claimed is:

1. A tube-type ozone generator comprising a tubular ozone generation unit, wherein
the ozone generation unit includes
a cylindrical outer electrode tube, and
an inner electrode tube provided inside the outer electrode tube with a discharge gap interposed between the outer and inner electrode tubes,
the inner electrode tube includes
a cylindrical dielectric tube, and
a cylindrical electrode being in close contact with an inner circumferential surface of the dielectric tube,
the electrode is removably disposed inside the dielectric tube,
on the inner circumferential surface of the dielectric tube, a free edge of the electrode overlaps a middle portion of the electrode in a radial direction, and
the free edge of the electrode is positioned between the dielectric tube and the middle portion of the electrode.

2. The ozone generator of claim 1, wherein
the electrode is a plate-shaped conductor having elasticity, and is in close contact with the inner circumferential surface of the dielectric tube as a result of having been spread inside the dielectric tube by the own elasticity.

3. The ozone generator of claim 2, wherein
the electrode is electrically connected to an external power supply through a terminal lead extending from the electrode.

4. The ozone generator of claim 2, wherein
the inner electrode tube further includes a terminal rod disposed inside the dielectric tube,
an edge of a portion of the conductor extending in a radial direction is joined to the terminal rod, and
the electrode is electrically connected to an external power supply through the terminal rod.

5. A method for manufacturing the ozone generator of claim 3, comprising:
preparing the conductor by rolling up the conductor in a cylindrical shape,
inserting the rolled up conductor into the dielectric tube, and
spreading the conductor inside the dielectric tube without applying external force.

6. A method for manufacturing the ozone generator of claim 4, comprising:
joining the edge of the conductor to the terminal rod,
winding the conductor around the terminal rod,
inserting the terminal rod having the conductor wound therearound into the dielectric tube, and
spreading the conductor inside the dielectric tube without applying external force.

* * * * *